(12) United States Patent
Yuan et al.

(10) Patent No.: US 9,515,576 B2
(45) Date of Patent: Dec. 6, 2016

(54) SHORT CIRCUIT DETECTION IN A CAPACITOR OF A DC-BRIDGE AND DC-BRIDGE PROTECTION

(71) Applicant: VOLTRONIC POWER TECHNOLOGY CORP., Taipei (TW)

(72) Inventors: Yi-Sheng Yuan, Nanchang (CN); Chun-Juan Zhan, Nanchang (CN); Juor-Ming Hsieh, Taipei (TW)

(73) Assignee: VOLTRONIC POWER TECHNOLOGY CORP., Taipei (TW)

( * ) Notice: Subject to any disclaimer, the term of this patent is extended or adjusted under 35 U.S.C. 154(b) by 36 days.

(21) Appl. No.: 14/637,536

(22) Filed: Mar. 4, 2015

(65) Prior Publication Data

US 2015/0256106 A1    Sep. 10, 2015

(30) Foreign Application Priority Data

Mar. 5, 2014    (CN) .......................... 2014 1 0079118

(51) Int. Cl.

| H02M 1/08 | (2006.01) |
|---|---|
| H02M 7/5387 | (2007.01) |
| H02M 1/32 | (2007.01) |
| H02M 1/00 | (2006.01) |
| H02H 7/122 | (2006.01) |
| H02H 7/12 | (2006.01) |

(52) U.S. Cl.
CPC ............. *H02M 7/5387* (2013.01); *H02M 1/32* (2013.01); *H02H 7/1213* (2013.01); *H02H 7/1222* (2013.01); *H02M 2001/007* (2013.01); *H02M 2001/0009* (2013.01)

(58) Field of Classification Search
CPC .................. H02M 2001/007; H02M 2001/009
See application file for complete search history.

(56) References Cited

U.S. PATENT DOCUMENTS

| 4,805,063 A | * | 2/1989 | Kataoka ................. G01R 31/42 324/548 |
|---|---|---|---|
| 5,373,195 A | * | 12/1994 | De Doncker ......... B60L 11/005 307/45 |
| 5,987,119 A | * | 11/1999 | Lee ..................... H04M 1/7385 379/377 |

\* cited by examiner

*Primary Examiner* — Harry Behm
*Assistant Examiner* — Peter Novak
(74) *Attorney, Agent, or Firm* — Li & Cai Intellectual Property (USA) Office

(57) ABSTRACT

A bridge circuit and a short-circuit protection method thereof. The bridge circuit includes an input power unit, a converter unit, a first capacitor, a second capacitor, a detection unit and a bridge inverter unit. The input power unit includes a first electrode and a second electrode. The converter unit is coupled to the input power unit. The first capacitor includes a first terminal and a second terminal. The second capacitor includes a first terminal and a second terminal. The bridge inverter unit includes a plurality of switches and is coupled to the converter unit, the first capacitor, the second capacitor, the detection unit and the second electrode. The detection unit issues a short-circuit signal to a control unit when the detection unit detects a current variation on the second capacitor.

10 Claims, 6 Drawing Sheets

SHORT CIRCUIT DETECTION IN A CAPACITOR OF A DC-BRIDGE AND DC-BRIDGE PROTECTION

BACKGROUND

1. Technical Field

The present invention generally relates to a bridge circuit and a short-circuit protection thereof and, more particularly, to a bridge circuit with short-circuit protection and a short-circuit protection method thereof.

2. Description of Related Art

With reference to FIG. 1A, in the inverter having a bridge inverter unit, short-circuit protection for the switches K1~K12 on the same bridge arm is a key issue. Each of the bridge arms is provided with a current sensor. However, for an inverter with six bridge arms, as shown in FIG. 1A, six current sensors T1~T6 are required to detect the current through each of the switches K1~K12 on the bridge arms. As a result, the manufacturing cost and the circuit area are increased and the complexity in circuit design is enhanced as well.

A simplified method is to use a current transducer on the direct-current (DC) bus to detect the total current on a bridge circuit to be coupled thereto, as shown in FIG. 1B. In this configuration, if the current transducer is implanted by a current transformer, high-frequency voltage fluctuations across the bridge arm will occur due to the parasitic inductance of the current transformer. The current transformer has an inherited reset issue. Otherwise, the cost may increase if the current transducer is implemented by a Hall sensor.

SUMMARY

The present invention provides a bridge circuit with short-circuit protection and a method thereof. In one embodiment of the present invention, a current variation on a high-frequency capacitor with small capacity is detected to determine whether the bridge inverter unit is short-circuited. In the present invention, short-circuit protection on the bridge circuit is improved with reduced circuit area and lowered manufacturing cost.

One embodiment of the present invention provides a bridge circuit and a short-circuit protection method thereof. The bridge circuit includes an input power unit, a converter unit, a first capacitor, a second capacitor, a detection unit and a bridge inverter unit. The input power unit includes a first electrode and a second electrode. The converter unit is coupled to the input power unit. The first capacitor includes a first terminal and a second terminal. The first terminal of the first capacitor is coupled to the converter unit. The second terminal of the first capacitor is coupled to the second electrode. The second capacitor includes a first terminal and a second terminal. The first terminal of the second capacitor is coupled to the first terminal of the first capacitor. The detection unit is coupled to the second terminal of the second capacitor. The bridge inverter unit includes a plurality of switches and is coupled to the converter unit, the first capacitor, the second capacitor, the detection unit and the second electrode. The detection unit issues a short-circuit signal to a control unit when the detection unit detects a current variation on the second capacitor.

One embodiment of the present invention further provides a short-circuit protection method of a bridge circuit. The bridge circuit includes an input power unit, a converter unit, a first capacitor, a second capacitor, a detection unit and a bridge inverter unit. The short-circuit protection method includes steps as follows. The detection unit determines whether a current variation on the second capacitor has been detected. The detection unit issues a short-circuit signal to a control unit if the current variation on the second capacitor has been detected.

In summary, the bridge circuit with short-circuit protection according to one embodiment of the present invention determines whether the bridge circuit is short-circuited by detecting a current variation on a second capacitor with small capacity. The current through the second capacitor occupies a small amount of the total current on the DC bus. Therefore, the current variation on the second capacitor can be analyzed by, for example, issuing a short-circuit signal to a control unit when an opto-coupler is turned on by receiving a pre-determined current. As a result, short-circuit protection on the bridge arm circuit can be improved with reduced circuit area.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1A:
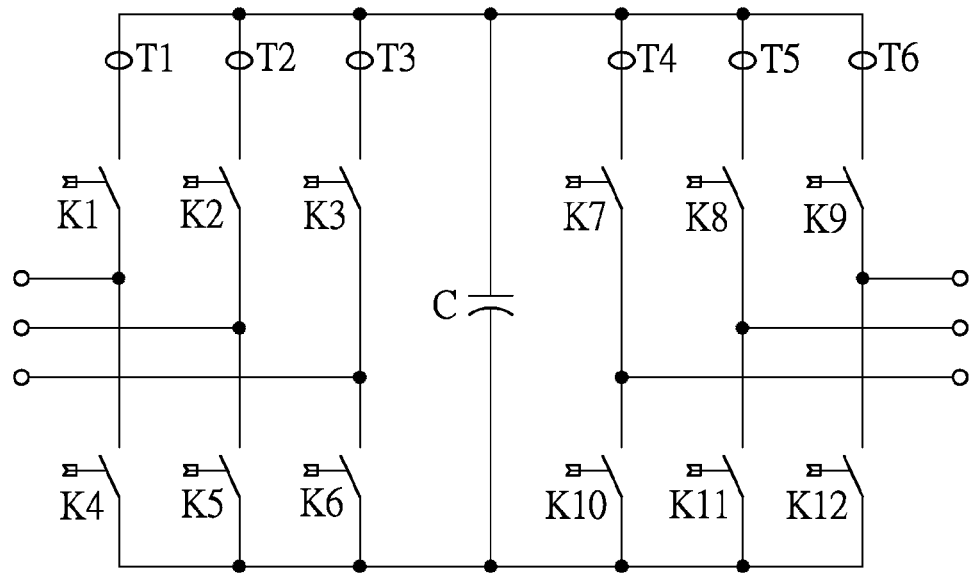
FIG. 1A is a conventional bridge circuit with short-circuit protection.
Figure 1B:
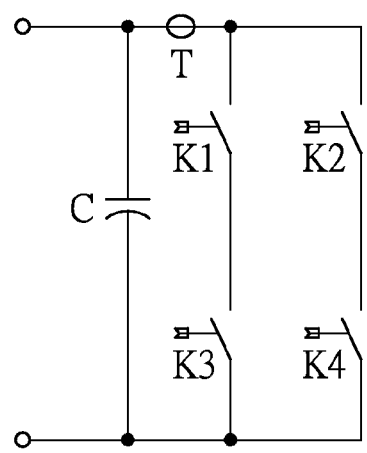
FIG. 1B is another conventional bridge circuit with short-circuit protection.

Reference will now be made in detail to the exemplary embodiments of the present disclosure, examples of which are illustrated in the accompanying drawings. Wherever possible, the same reference numbers are used in the drawings and the description to refer to the same or like parts.

Figure 2:
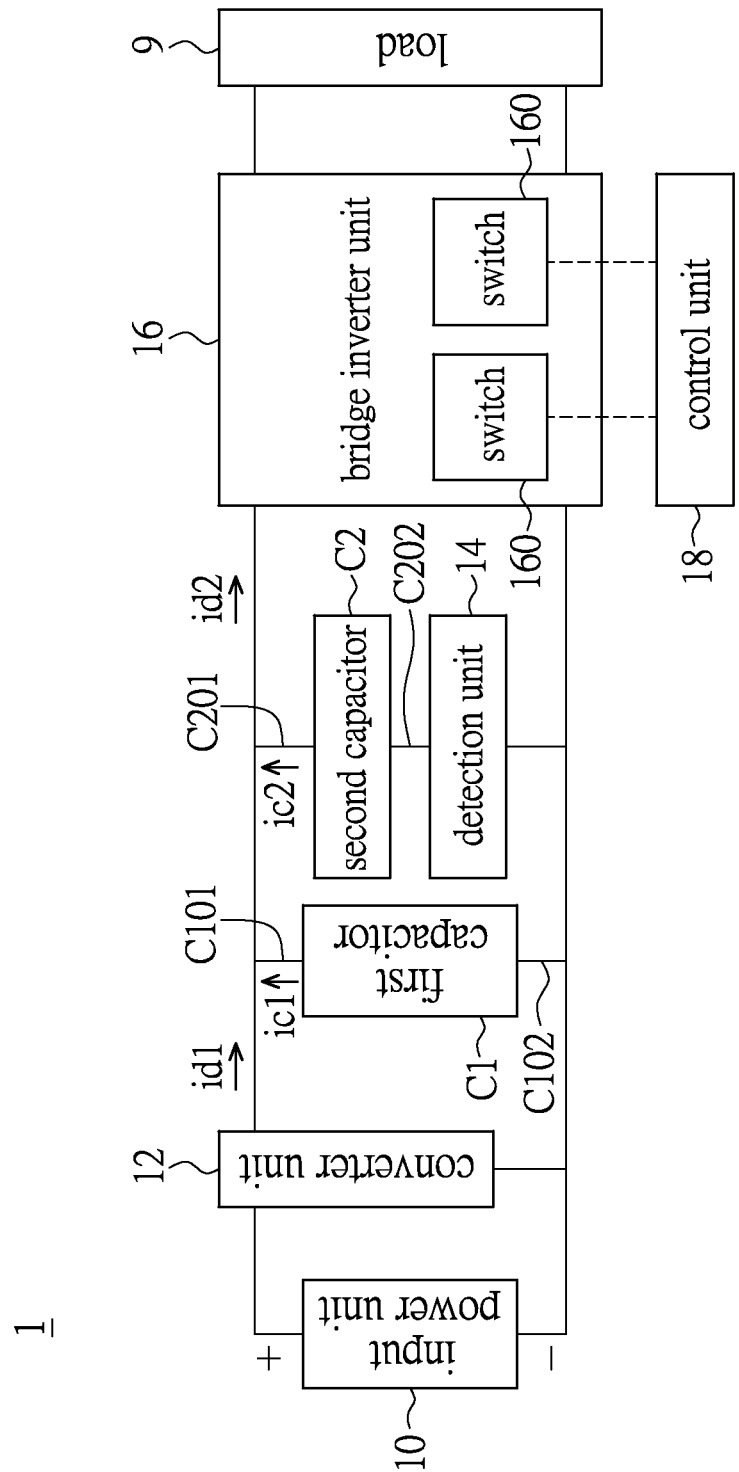
FIG. 2 is a block diagram of a bridge circuit with short-circuit protection according to one embodiment of the present invention.

FIG. 2 is a block diagram of a bridge circuit with short-circuit protection according to one embodiment of the present invention. With reference to FIG. 2, a bridge circuit 1 with short-circuit protection includes an input power unit 10, a converter unit 12, a first capacitor C1, a second capacitor C2, a detection unit 14 and a bridge inverter unit 16. Practically, the converter unit 12 is coupled to the input power unit 10, the first capacitor C1, the second capacitor C2, the detection unit 14 and the bridge inverter unit 16. The first capacitor C1 and the converter unit 12 are connected in parallel, the second capacitor C2 and the first capacitor C1 are connected in parallel, and the second capacitor C2 and the detection unit 14 are connected in series. The bridge inverter unit 16 is coupled to the converter unit 12, the first capacitor C1, the second capacitor C2, the detection unit 14 and a load 9. A control unit 18 is coupled to the switches 160 of the bridge inverter unit 16.

Simply put, the total current of the current ic1 through the first capacitor C1 and the current ic2 through the second capacitor C2 equals the difference between the current id2 and the current id1 on the DC bus when the switches 160 of the bridge inverter unit 16 operate normally (i.e., ic1+ic2=id2−id1). Under normal conditions when the input voltage and the load are stably controlled, the average current of the current ic1 and the current ic2 is zero with the loss on the first capacitor C1 and on the second capacitor C2 being neglected. However, there are ripple currents on the current ic1 and the current ic2 during charging/discharging by switching operations. The ripple currents depend on ic1+ic2=id2−id1 and are small. Since the capacitance of the second capacitor C2 is much smaller than the capacitance of the first capacitor C1, the ripple current on the current ic2 is negligible and the current ic2 is almost zero. On the contrary, under abnormal conditions when the switches 160 of the bridge inverter unit 16 operate abnormally (for example, being short-circuited), the current id2 increases rapidly with the transient current id1 staying unchanged. Therefore, the current is ic1 through the first capacitor C1 and the current ic2 through the second capacitor C2 increase with the rapid increase of id2. Practically, the first capacitor C1 is an electrolytic capacitor with large capacity. The capacitance of the second capacitor C2 depends on the maximum current (im) through the switches 160, the threshold current (iop) of the opto-coupler in the detection unit 14 and the capacitance of the first capacitor C1, i.e., C2=iop*C1/(im−id1−iop). The capacitance of the second capacitor C2 is much smaller than the capacitance of the first capacitor C1. Accordingly, the current ic2 through the second capacitor C2 is much smaller than the current ic1 through the first capacitor C1. In one embodiment of the present invention, the detection unit 14 detects a small variation (mA level) of the current ic2 through the second capacitor C2 to detect a short-circuit signal.

The input power unit 10 includes a first electrode and a second electrode. Practically, the input power unit 10 is, for example, an input DC power unit to turn input AC power into input DC power. The first electrode is, for example, an anode +, and the second electrode is, for example, a cathode −. In other embodiment, the first electrode is, for example, a cathode, and the second electrode is, for example, an anode. The present invention is, however, not limited to the previous examples of the input power unit 10, the first electrode and the second electrode. Moreover, the input power unit 10 uses, for example, a filter circuit and/or a rectifier circuit to output DC power. For example, the DC power is obtained by filtering and/or rectifying the waveform of AC power and is supplied to the converter unit 12.

The converter unit 12 is coupled to the input power unit 10. Practically, the converter unit 12 is, for example, a boost circuit. To make the description more easily understood, in one embodiment of the present invention, the converter unit 12 is implemented by a boost circuit as an example. In other embodiments, the converter unit 12 is, for example, a buck circuit or a buck-boost circuit. The present invention is, however, not limited to the previous examples of the converter unit 12. The person with ordinary skill in the art may understand the operations of a boost circuit, a buck circuit and/or a buck-boost circuit, and thus descriptions thereof are not redundantly repeated herein.

The first capacitor C1 includes a first terminal C101 and a second terminal C102. The first terminal C101 of the first capacitor C1 is coupled to the converter unit 12. The second terminal C102 of the first capacitor C1 is coupled to the second electrode of the input power unit 10. Practically, the first terminal C101 of the first capacitor C1 is coupled to the anode of the DC bus. The second terminal C102 of the first capacitor C1 is coupled to the cathode of the DC bus. The first capacitor C1 is an electrolytic capacitor with large capacity. Therefore, the capacitance of the first capacitor C1 equals the input capacitance of the input power unit 10. The present invention is, however, not limited to the previous example of the first capacitor C1.

The second capacitor C2 includes a first terminal C201 and a second terminal C202. The first terminal C201 of the second capacitor C2 is coupled to the first terminal C101 of the first capacitor C1. Practically, the capacitance of the first capacitor C1 is much larger than the capacitance of the second capacitor C2. The second capacitor C2 is a high-frequency capacitor with small capacity. The present invention is, however, not limited to the previous example of the second capacitor C2.

The detection unit 14 is coupled to the second terminal C202 of the second capacitor C2. Practically, the detection unit 14 includes, for example, a diode, an opto-coupler, an operation voltage source and a resistor. The present invention is, however, not limited to the previous example of the detection unit 14. The detection unit 14 detects a current variation on the second capacitor C2 and issues a normal signal or a short-circuit signal to the control unit 18 according to the current variation.

The bridge inverter unit 16 includes a plurality of switches 160 and is coupled to the converter unit 12, the first capacitor C1, the second capacitor C2, the detection unit 14 and the second electrode. Practically, the bridge inverter unit 16 is a single-phase bridge inverter or a three-phase bridge inverter. The bridge inverter unit 16 may also be implemented by a half-bridge inverter or a full-bridge inverter. The bridge inverter unit 16 turns the output of the input power unit 10 into an AC voltage to be supplied to a load 9. The present invention is, however, not limited to the previous examples of the bridge inverter unit 16. Moreover, the switches 160 are, for example, metal-oxide-semiconductor field-effect transistors (MOSFETs) or power transistors. The present invention is, however, not limited to the previous examples of the switches 160.

For example, in the bridge inverter unit 16 that includes a bridge arm circuit, the bridge inverter unit 16 is connected in parallel with a second capacitor C2 having small capacity. The discharge current on the second capacitor C2 is detected by the detection unit 14. When the discharge current on the second capacitor C2 reaches a threshold current value, which indicates that the bridge inverter unit 16 issues a short-circuit current, the detection unit 14 detects a current variation and issues a short-circuit signal to the control unit 18.

Furthermore, when the bridge inverter unit 16 appears to be short-circuited, the current id2 on the DC bus increases rapidly and the current id1 on the DC bus stays unchanged. The total current of the current ic1 through the first capacitor C1 and the current ic2 through the second capacitor C2 equals the difference between the current id2 and the current id1 on the DC bus. From the equations ic1+ic2=id2−id1 and ic2=(id2−id1)*C2/(C1+C2), it should be known that the current ic2 through the second capacitor C2 occupies a small amount of the current (id2−id1) on the DC bus when a short-circuit current is detected. Therefore, in the present embodiment, a small current variation on the second capacitor is detected. Accordingly, the capacity for the current element required to be detected is much smaller than the capacity of the current sensor on DC bus.

In the present embodiment, if the second capacitor C2 is properly provided, only a sheet resistor connected in series with the second terminal C202 of the second capacitor C2 is required to detect the current variation when the bridge arm is short-circuited by detecting the voltage variation across the sheet resistor. The detection unit 14 issues a short-circuit signal to the control unit 18 when the detection unit 14 detects the current variation on the second capacitor C2. As a result, the short-circuit signal can be precisely detected with reduced circuit area in the present embodiment.

Afterwards, detailed descriptions of the bridge circuit 1 and operations thereof are presented herein.

Figure 3:
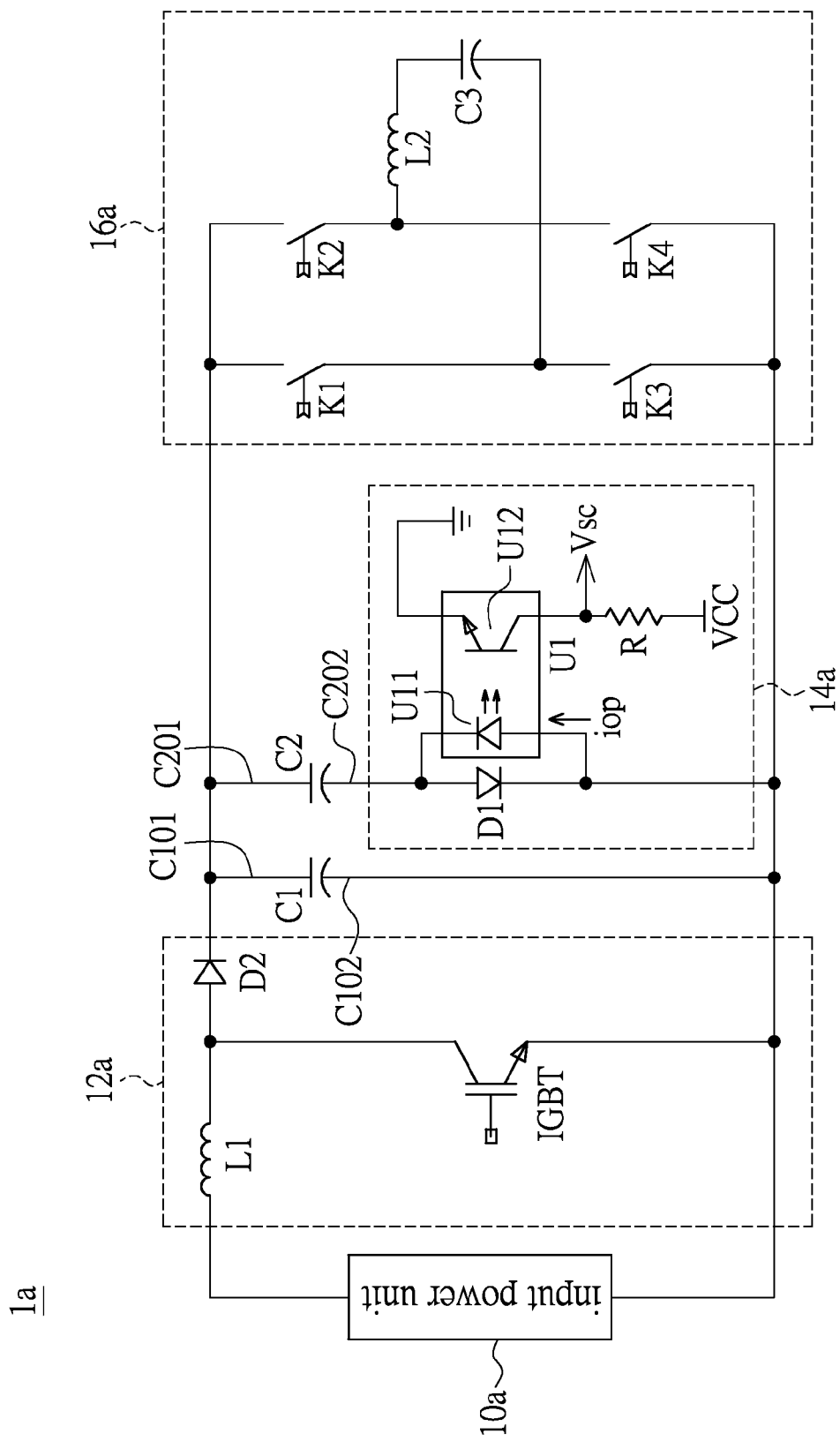
FIG. 3 is a bridge circuit with short-circuit protection according to another embodiment of the present invention.

FIG. 3 is a bridge circuit with short-circuit protection according to another embodiment of the present invention. More particularly, with reference to FIG. 3, the detection unit 14a includes a first diode D1, an opto-coupler U1, a resistor R and an operation voltage source VCC. The anode of the first diode D1 is coupled to the second terminal C202 of the second capacitor C2. The cathode of the first diode D1 is coupled to the second electrode. The opto-coupler U1 is coupled to the first diode D1, a grounding terminal and the resistor R. The resistor R is coupled to the operation voltage source VCC. The current variation is a pre-determined current received by the opto-coupler U1 to turn on the opto-coupler U1 so that a low logic level is built between the resistor and the opto-coupler.

Furthermore, the model of the opto-coupler U1 is, for example, HCPL2602. The present invention is, however, not limited to the previous example of the opto-coupler U1. The opto-coupler U1 includes a first sensor unit U11 and a second sensor unit U12. The second sensor unit U12 is optically coupled to the first sensor unit U11. The first sensor unit U11 is coupled to the first diode D1. The first sensor unit U11 is, for example, an LED inside the opto-coupler U1. The threshold current for another opto-coupler U1 is, for example, the threshold current iop through the first sensor unit U11. The threshold current iop is as small as, for example, some milli-amperes (mA). The present invention is, however, not limited to the previous example of the threshold current iop.

The anode of the LED inside the opto-coupler U1 is coupled to the cathode of the first diode D1. The cathode of the LED inside the opto-coupler U1 is coupled to the anode of the first diode D1. The second sensor unit U12 is coupled to the resistor R and the grounding terminal. The first sensor unit U11 is, for example, a light emitter. The second sensor unit U12 is, for example, a photodetector. The pre-determined current flows through the first sensor unit U11 so that the first sensor unit U11 provides the second sensor unit U12 with an opto-coupler signal. The second sensor unit U12 is turned on according to the opto-coupler signal to ground the resistor R.

When the opto-coupler U1 is turned off, the first sensor unit U11 and the second sensor unit U12 are both turned off. Accordingly, the operation voltage source VCC cannot be coupled to the grounding terminal. A high logic level is thus built between the opto-coupler U1 and the resistor R.

Therefore, the high logic level signal issued or detected between the opto-coupler U1 and the resistor R indicates that the bridge inverter unit 16a operates normally.

On the contrary, when the opto-coupler U1 is turned on, the first sensor unit U11 and the second sensor unit U12 are both turned on. The operation voltage source VCC is coupled to the grounding terminal. Therefore, a low logic level is built between the opto-coupler U1 and the resistor R. The low logic level issued or detected between the opto-coupler U1 and the resistor R is a short-circuit signal indicating that the bridge inverter unit 16a operates abnormally.

It should be noted that the first capacitor C1 may include a plurality of capacitors. The capacitance of each of the first capacitors is, for example, 470 UF/500V, and the first capacitor C1 is implemented by 12 capacitors connected in parallel. The present invention is, however, not limited to the previous example of the first capacitor C1. The model of the second capacitor C2 is, for example, CBB21 (MPP). The capacitance of the second capacitor C2 is, for example, 0.47 UF/630 VDC. The present invention is, however, not limited to the previous example of the second capacitor C2. Moreover, the model of the first diode D1 is, for example, 1N4148. The present invention is, however, not limited to the previous example of the first diode D1. The resistance of the resistor R is, for example, 1K ohms. The present invention is, however, not limited to the previous example of the resistor R.

Moreover, the converter unit 12a of the present embodiment is implemented by a boost circuit as an example. The converter unit 12a includes an inductor element L1, a diode element D2 and a switch element IGBT. The inductor element L1 is coupled to the first electrode of the input power unit 10a and the anode of the diode element D2. The cathode of the diode element D2 is coupled to the inductor element L1, the first capacitor C1, the second capacitor C2 and the bridge inverter unit 16a.

Furthermore, the diode element D2 is, for example, a large-power rectifying diode. The model of the diode element D2 is, for example, STTH6006W. The present invention is, however, not limited to the previous example of the diode element D2. The switch element IGBT is, for example, a power switching transistor. The model of the power switching transistor is, for example, IGBT IGW50N60H3. The power switching transistor includes a collector (C), an emitter (E) and a base (B). The collector (C) is coupled to the inductor element L1 and the diode element D2. The emitter (E) is coupled to the second electrode of the input power unit 10a, the second terminal C102 of the first capacitor C1 and the detection unit 14. Moreover, the inductance of the inductor element L1 is, for example, 544 uH. The present invention is, however, not limited to the previous example of the inductor element L1.

The bridge inverter unit 16a includes switches K1~K4, an inverter inductor L2 and a filter capacitor C3. The switches K1~K4, the inverter inductor L2 and the filter capacitor C3 construct an output inverter circuit. The model of the switches K1~K4 is, for example, FGA25N120. The present invention is, however, not limited to the previous example of the switches K1~K4.

Furthermore, the switches K1~K4 are, for example, large-power switching transistors. Each of the large-power switching transistors includes a source, a drain and a drain. The source of the switch K1 is coupled to the drain of the switch K3. The source of the switch K3 is coupled to the second electrode. The source of the switch K2 is coupled to the drain of the switch K4. The source of the switch K4 is coupled to the second electrode. Moreover, one terminal of the inverter inductor L2 is coupled to the source of the switch K2. Another terminal of the inverter inductor L2 is coupled to the filter capacitor C3. The inductance of the inverter inductor L2 is, for example, 144 uH. The filter capacitor C3 includes, for example, 4 capacitor elements having capacitance of 20 UF/350 VAC. The present invention is, however, not limited to the previous examples of the inverter inductor L2 and the filter capacitor C3.

Figure 4A:
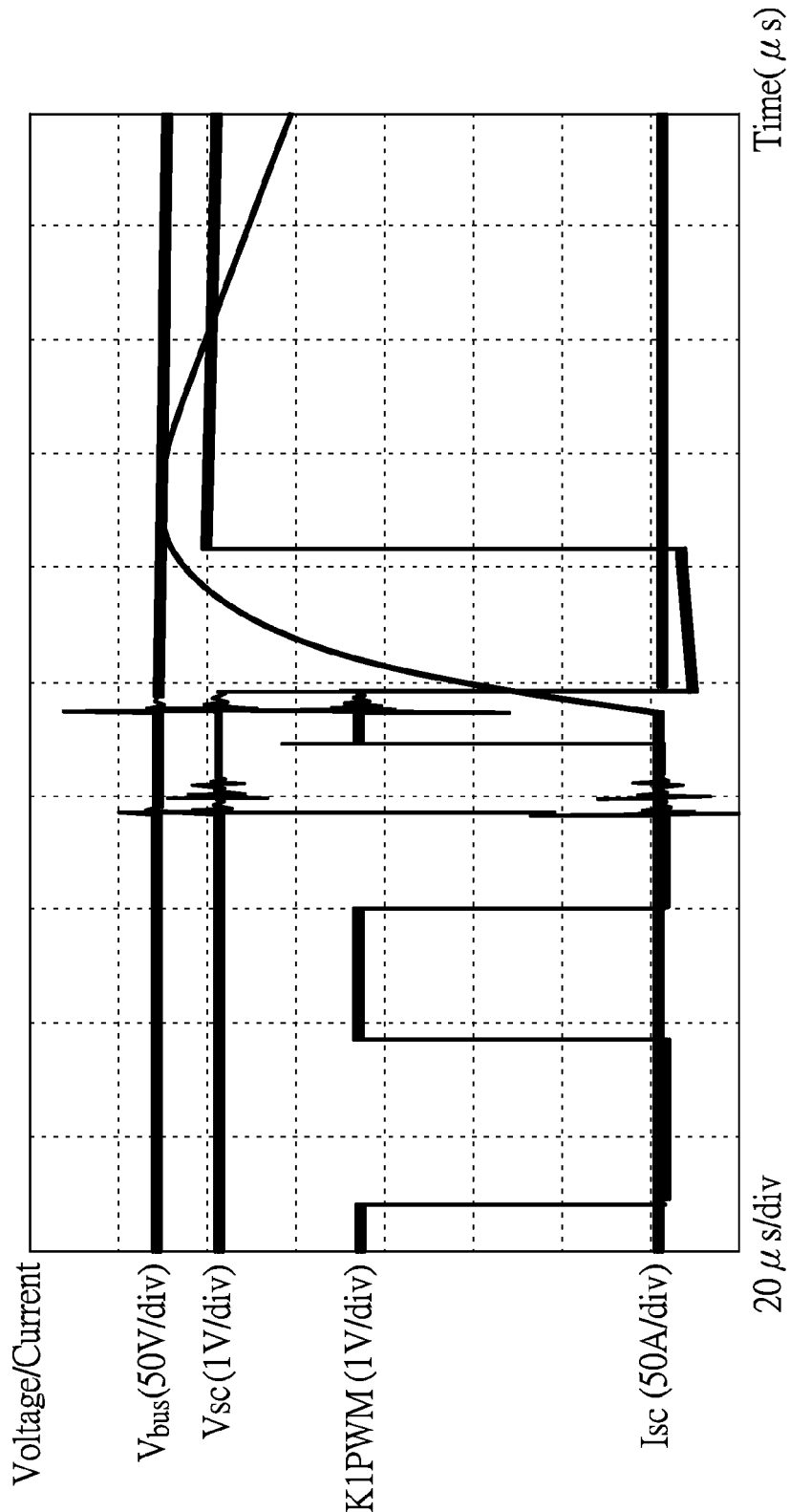
FIG. 4A is a voltage waveform of a bridge circuit with short-circuit protection according to another embodiment of the present invention.
Figure 4B:
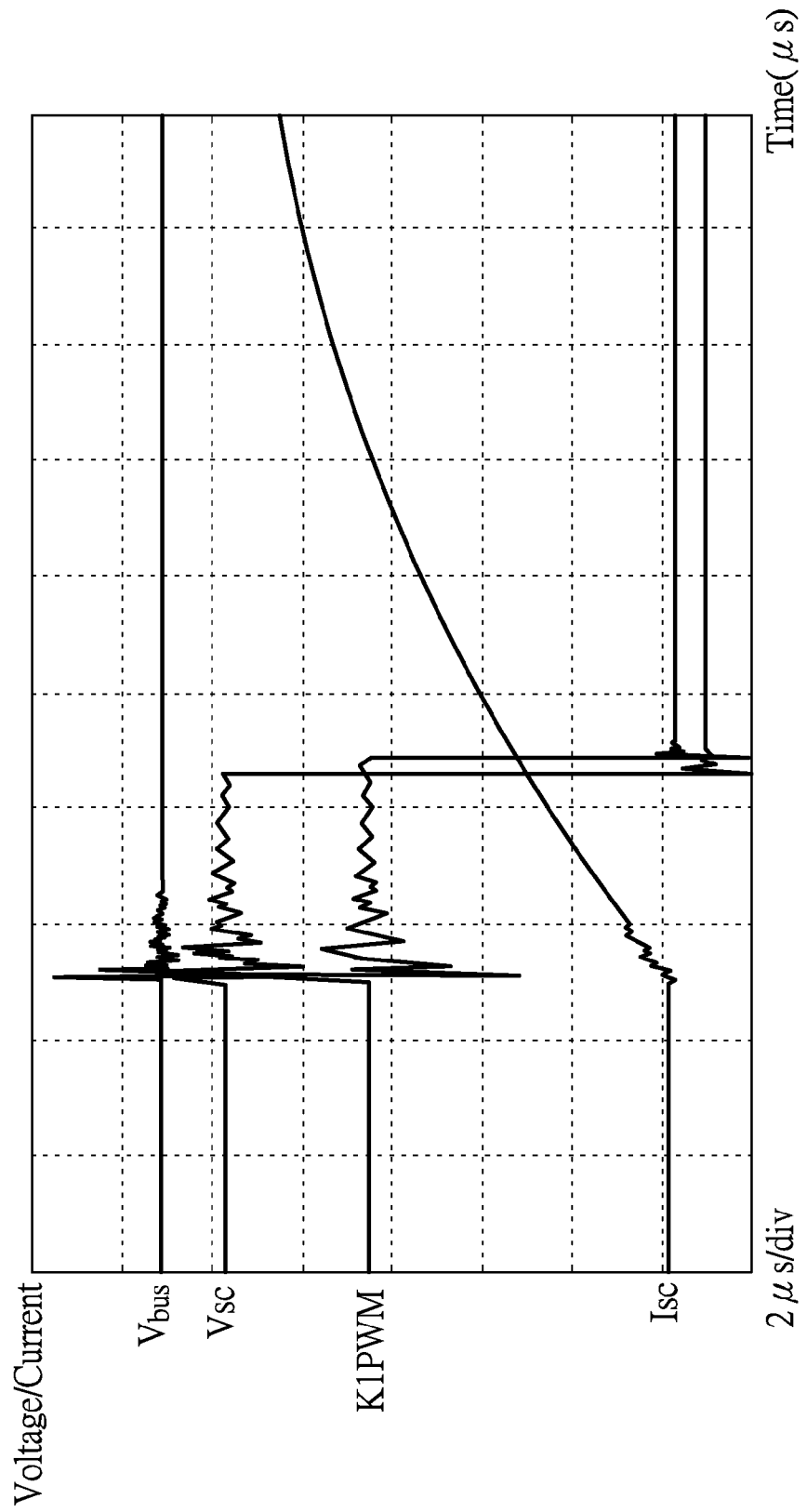
FIG. 4B is a partially enlarged voltage waveform of a bridge circuit with short-circuit protection according to another embodiment of the present invention as shown in FIG. 4A.

FIG. 4A is a voltage waveform of a bridge circuit with short-circuit protection according to another embodiment of the present invention; and FIG. 4B is a partially enlarged voltage waveform of a bridge circuit with short-circuit protection according to another embodiment of the present invention as shown in FIG. 4A. With reference to FIG. 4A, a voltage waveform Vbus (50V/div) on the DC bus, a voltage waveform Vsc (1V/div) of the short-circuit signal, a current waveform Isc (50 A/div) when the bridge arm of the bridge inverter unit 16a is short circuited, and a waveform K1PWM (1V/div) of the control signal issued by the control unit are displayed.

With reference to FIG. 4B, a voltage waveform Vbus on the DC bus, a voltage waveform Vsc of the short-circuit signal, a current waveform Isc when the bridge arm of the bridge inverter unit 16a is short circuited, and a waveform K1PWM of the control signal issued by the control unit are displayed. FIG. 4B is a partially enlarged voltage waveform of a bridge circuit with short-circuit protection according to the present embodiment, which shows the control signal waveform of the switch K1, a PWM signal, for example. As shown in FIG. 4B, when the bridge arm of the bridge inverter unit 16 is short circuited, the short-circuit current of the bridge arm reaches 75 A and the short-circuit signal drops from a high logic level of 5V to a low logic level. Meanwhile, the control unit stops issuing the control signal to the switch K1. The present invention is, however, not limited to the previous examples of the voltage waveforms of the bridge circuit with short-circuit protection.

Figure 5:
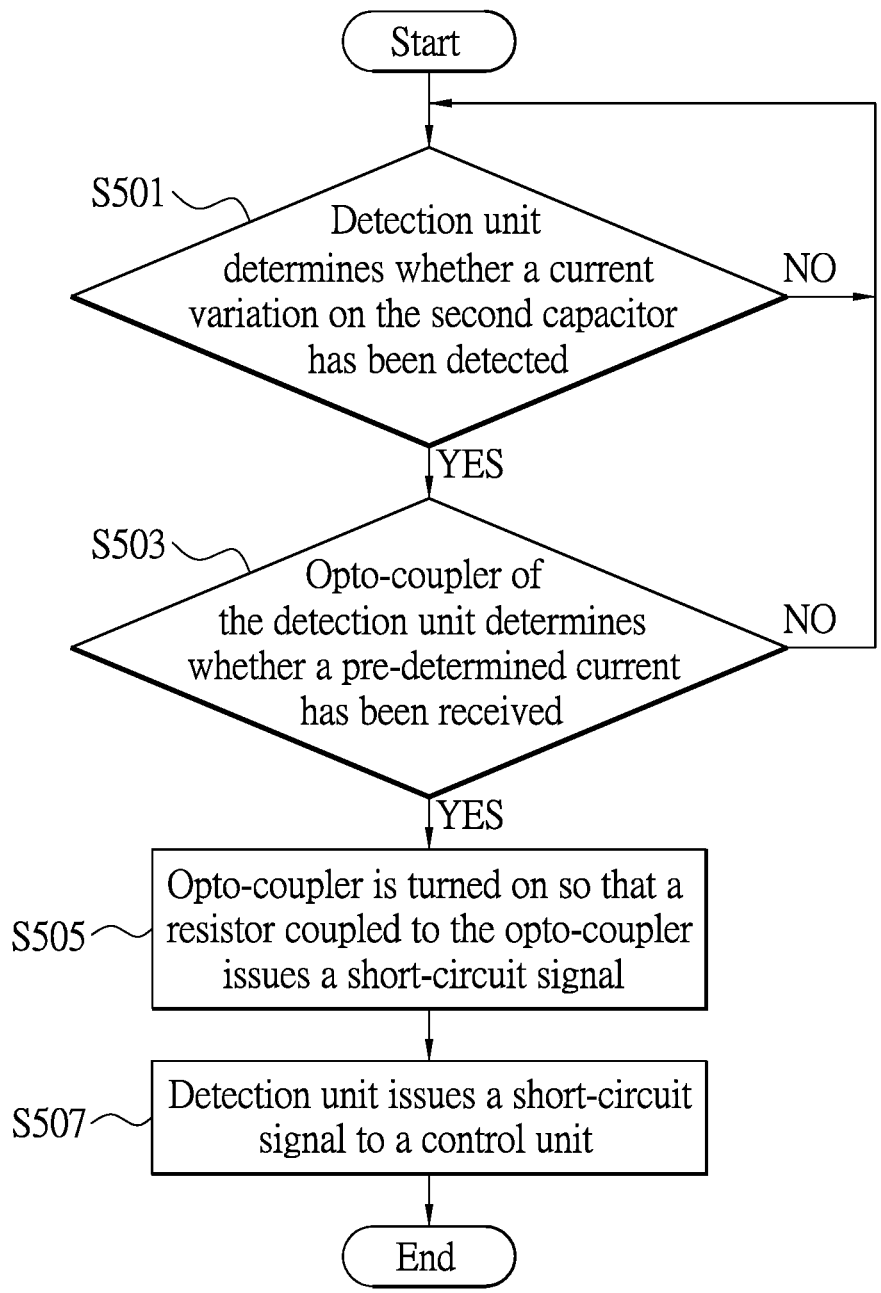
FIG. 5 is a flow chart of a short-circuit protection method according to another embodiment of the present invention.

FIG. 5 is a flow chart of a short-circuit protection method according to another embodiment of the present invention. With reference to FIG. 5. the short-circuit protection method suitable for use with the bridge circuit with short-circuit protection includes the following steps:

In Step S501, the detection unit determines whether a current variation on the second capacitor has been detected. Practically, the current through the first capacitor is much larger than the current through the second capacitor. When the bridge inverter unit breaks down, for example, to cause abnormal on/off operations, both the current through the first capacitor and the current through the second capacitor increase. Therefore, the current through the DC bus increases. As a result, the minimal current variation on the second capacitor detected by the detection unit increases as well. If, in Step S501, the detection unit determines that there is no detected current variation on the second capacitor, the detection unit keeps on detecting the current variation on the second capacitor.

If, in Step S501, the detection unit determines that a current variation on the second capacitor has been detected, the method proceeds with Step S503 so as to determine whether an opto-coupler of the detection unit has received a pre-determined current. Practically, the opto-coupler of the detection unit further determines whether a pre-determined current has been received when the current through the second capacitor increases. When the current through the first sensor unit of the opto-coupler reaches the pre-determined current, the first sensor unit is turned on and issues an opto-coupler signal to the second sensor unit to turn on the second sensor unit.

Accordingly, in Step S505, the opto-coupler is turned on so that a resistor coupled to the opto-coupler issues a short-circuit signal. Practically, when the opto-coupler is turned off, the operation power cannot be coupled to the grounding terminal. A high logic level is thus built between the opto-coupler and the resistor. The high logic level is, for example, a 5V operation voltage. Accordingly, the high logic level issued or detected between the opto-coupler and the resistor is a normal signal in the present embodiment.

On the contrary, when the opto-coupler is turned on, the operation power is coupled to the grounding terminal. Therefore, a low logic level is built between the opto-coupler and the resistor. The low logic level is, for example, zero volt. The low logic level issued or detected between the opto-coupler and the resistor is a short-circuit signal in the present embodiment.

Afterwards, in Step S507, the detection unit issues a short-circuit signal to a control unit. Practically, when a low logic level signal is issued between the opto-coupler and the resistor, the low logic level signal is a short-circuit signal. Therefore, the control unit controls the bridge inverter unit to stop operating after the control unit receives the short-circuit signal. As a result, the switches in the bridge inverter unit are protected and power is safely supplied to electric appliances coupled to the bridge inverter unit.

In summary, the bridge circuit with short-circuit protection according to one embodiment of the present invention determines whether the bridge circuit is short-circuited by detecting a current variation on a second capacitor with small capacity. The first sensor unit issues an opto-coupler signal to the second sensor unit so that the second sensor unit connects the resistor and the grounding terminal when the first sensor unit of the opto-coupler receives a pre-determined current. Therefore, a low logic level is built between the second sensor unit and the resistor as a short-circuit signal issued to the control unit to achieve short-circuit protection. As a result, short-circuit protection on the bridge arm circuit can be improved with reduced circuit area.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:
1. A bridge circuit, comprising:
an input power unit comprising a first electrode and a second electrode;
a converter unit being coupled to said input power unit;
a first capacitor comprising a first terminal and a second terminal, said first terminal of said first capacitor being coupled to said converter unit, said second terminal of said first capacitor being coupled to said second electrode;
a second capacitor comprising a first terminal and a second terminal, said first terminal of said second capacitor being coupled to said first terminal of said first capacitor, wherein the capacitance of said first capacitor is larger than the capacitance of said second capacitor, said second capacitor being a high-frequency capacitor;

a detection unit being coupled to said second terminal of said second capacitor, said detection unit comprises a first diode, an opto-coupler, a resistor and an operation voltage source; and a bridge inverter unit comprising a plurality of switches and being coupled to said converter unit, said first capacitor, said second capacitor, said detection unit and said second electrode;

wherein said detection unit issues a short-circuit signal to a control unit when said detection unit detects a current variation on said second capacitor;

wherein said second capacitor and said first diode of said detection unit are electrically connected in series, said first diode is electrically connected in parallel with said opto-coupler of said detection unit, and said resistor is coupled to said opto-coupler and said operation voltage source.

2. The bridge circuit of claim 1, wherein an anode of said first diode being coupled to said the second terminal of said second capacitor, a cathode of said first diode being coupled to said second electrode, said opto-coupler being coupled to said first diode, a grounding terminal and said resistor, said resistor being coupled to said operation voltage source.

3. The bridge circuit of claim 2, wherein said current variation is a pre-determined current received by said opto-coupler to turn on said opto-coupler so that a low logic level is built between said resistor and said opto-coupler.

4. The bridge circuit of claim 3, wherein said opto-coupler comprises a first sensor unit and a second sensor unit, said first sensor unit being coupled to said first diode, said second sensor unit being coupled to said resistor and said grounding terminal.

5. The bridge circuit of claim 4, wherein said first sensor unit is a light emitter and said second sensor unit is a photodetector, said pre-determined current flowing through said first sensor unit so that said first sensor unit issues an opto-coupler signal to said second sensor unit to turn on said second sensor unit so that said grounding terminal is electrically connected to said resistor, said short-circuit signal being a low logic level.

6. The bridge circuit of claim 1, wherein said converter unit is a boost circuit, a buck circuit or a buck-boost circuit.

7. The bridge circuit of claim 1, wherein said converter unit comprises an inductor element, a diode element and a switch element, said inductor element being coupled to said first electrode of said input power unit and an anode of said diode element, a cathode of said diode element being coupled to said inductor element, said first capacitor, said second capacitor and said bridge inverter unit.

8. The bridge circuit of claim 1, wherein said bridge inverter unit is a single-phase bridge inverter or a three-phase bridge inverter, wherein said bridge inverter unit turns an output of said input power unit into an alternate-current (AC) voltage to be supplied to a load.

9. A short-circuit protection method of a bridge circuit, said bridge circuit comprising an input power unit, a converter unit, a first capacitor, a second capacitor, a detection unit and a bridge inverter unit, said input power unit being coupled to said converter unit, said first capacitor being coupled to said converter unit, said second capacitor and said first capacitor being connected in parallel, said second capacitor and said detection unit being connected in series, said bridge inverter unit being coupled to said second capacitor and said detection unit, and said short-circuit protection method comprising steps of:

determining by said detection unit whether a current variation on said second capacitor has been detected, wherein the capacitance of said first capacitor is larger than the capacitance of said second capacitor which said second capacitor being a high-frequency capacitor; said detection unit comprises a first diode, an opto-coupler, a resistor and an operation voltage source, wherein said second capacitor and said first diode of said detection unit are electrically connected in series, said first diode is electrically connected in parallel with said opto-coupler of said detection unit, and said resistor is coupled to said opto-coupler and said operation voltage source; and issuing by said detection unit a short-circuit signal to a control unit so that said control unit controls said bridge inverter unit to stop if said current variation on said second capacitor has been detected.

10. The short-circuit protection method of claim 9, wherein said step of determining whether said current variation on said second capacitor has been detected further comprises steps of:

determining by an opto-coupler of said detection unit whether a pre-determined current has been received; and turning on said opto-coupler so that a resistor coupled to said opto-coupler issues said short-circuit signal if said pre-determined current has been received.

* * * * *